Oct. 27, 1970  K. R. JENKIN  3,536,315

DIAPHRAGM SPRING

Filed Aug. 14, 1968

INVENTOR.
Keith R. Jenkin
BY
Bernard, McEwen & Rising
ATTORNEYS

United States Patent Office 3,536,315
Patented Oct. 27, 1970

3,536,315
DIAPHRAGM SPRING
Keith R. Jenkin, Sterling Heights, Mich., assignor to Speedring Corporation, Warren, Mich., a corporation of Delaware
Filed Aug. 14, 1968, Ser. No. 752,686
Int. Cl. F16f 1/32
U.S. Cl. 267—161    4 Claims

ABSTRACT OF THE DISCLOSURE

A diaphragm spring in the form of a disk divided into a plurality of concentric leaf portions by a plurality of arcuate slots. Each leaf portion is joined to the adjacent leaf portion along a portion of its periphery by an integral hinge portion, of reduced thickness, defined between the ends of the associated slot. The leaf portions are otherwise unconnected with each other and can thereby flex relative to each other about the hinge portions.

---

This invention relates generally to springs, and is particularly concerned with diaphragm springs, or springs of the type that normally lie in a plane in their unstressed condition, flexure of the spring taking place by axial movement of the central portion of the spring relative to the peripheral portion thereof.

Modern scientific and industrial operations are generally dependent in some degree on the accurate measurement and control of mechanical quantities. Many of these quantities can be measured directly in terms of a distance or linear displacement. Displacement or distance can be converted to an electrical response for the purpose of remote indication or control. Electromechanical transducers used for this function include instruments utilizing the change in self-inductance or mutual inductance produced by a movable magnetic element. An example of such instruments is disclosed in the co-pending application of Thomas D. Hayosh and Keith R. Jenkin, Ser. No. 752,685 filed on even date herewith, the entire disclosure of which is incorporated herein by reference.

In such instruments, a movable core element or armature must be suspended in such a manner that it can move relatively freely in an axial direction, but is restrained in a relatively rigid manner against movement in a transverse or radial direction. In many transducers, the movable core element is supported on one or more diaphragm springs. The primary problem encountered in such springs is that of obtaining sufficient axial flexibility so as to obtain sensitive response in an axial direction without sacrificing strength and rigidity in a transverse or radial direction.

It is, therefore, an object of this invention to provide a diaphragm spring having a high degree of flexibility in an axial direction and a high degree of rigidity in a transverse or radial direction.

Another object of this invention is to provide a diaphragm spring in which the central portion of the spring can readily flex in an axial direction with respect to the peripheral portion of the spring, and in which the central portion is relatively rigidly supported against radial or transverse flexure or movement relative to the peripheral portion of the spring.

A more specific object lies in the provision of a diaphragm spring having a plurality of leaf portions with adjacent pairs of the leaf portions joined over a portion of their periphery by a hinge portion such that each leaf portion can flex relative to an adjacent leaf portion about a hinge portion.

Another object of this invention is to provide a diaphragm spring having a plurality of leaf portions with adjacent pairs of the leaf portions joined over a portion of their periphery by a hinge portion of reduced thickness, the leaf portions being otherwise unconnected with each other such that the leaf portions can flex in the manner of a lever about the hinge portion, and such that the leaf portions can be made sufficiently thick to provide a high resistance to transverse or radial forces.

In carrying out the foregoing, and other objects, a spring according to the present invention includes a flat, planar member divided into a plurality of leaf portions by slots, the slots terminating in a hinge portion connecting adjacent pairs of the leaf portions over a portion of their peripheries such that each leaf portion can bend about the hinge portion relative to the adjacent leaf portion. Consequently, each leaf portion can flex relatively freely in an axial direction about the axis of the hinge portion, but is relatively rigidly supported against transverse or radial flexure. Increased flexibility is provided with hinge portions of reduced thickness relative to the leaf portions. Thus, the leaf portions can be made of sufficient thickness to provide a high resistance to transverse or radial forces without sacrificing axial flexibility.

In the preferred embodiment of the invention, the diaphragm spring comprises a disk having a plurality of concentric, arcuate slots dividing the disk into concentric leaf portions with hinge portions defined between the ends of each of the arcuate slots and joining the peripheries of adjacent pairs of the leaf portions. The hinge portions are of reduced thickness relative to the leaf portions, and the hinge portions connecting alternated pairs of the leaf portions are spaced 180° from each other in the plane of the disk about the central axis normal to the plane of the disk.

Other objects, advantages and features of the invention will become apparent from the following description taken in connection with the accompanying drawings in which.

Figure 1:
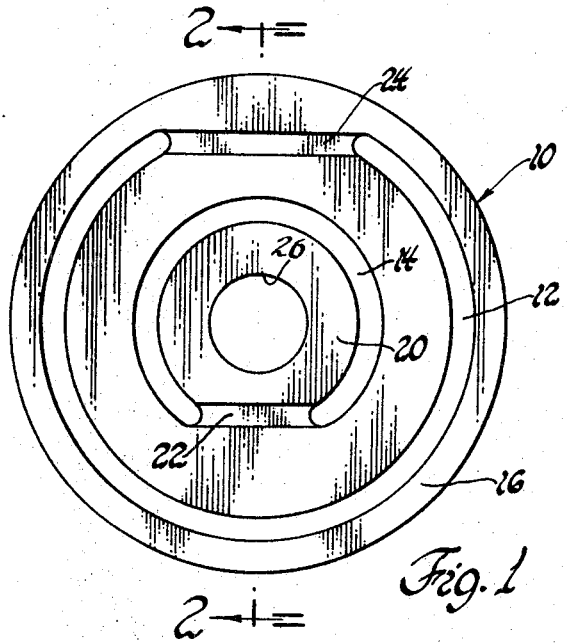
FIG. 1 is a plan view of a diaphragm spring embodying the invention in its preferred form.
Figure 2:
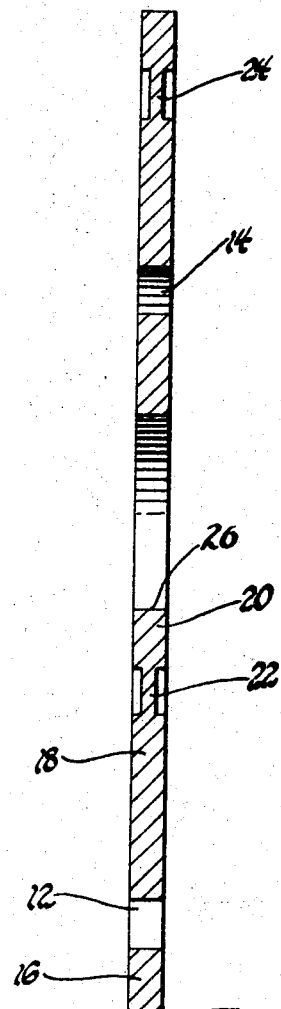
FIG. 2 is a sectional view taken on line 2—2 of FIG. 1.
Figure 3:
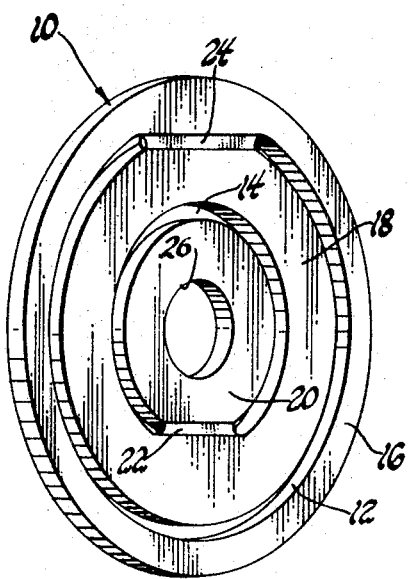
FIG. 3 is a perspective view of the diaphragm spring of FIGS. 1 and 2.

In the drawings, reference numeral 10 designates a flat spring member in the form of a disk which is divided into a plurality of leaf portions 16, 18 and 20 by a plurality of slots 12 and 14. The ends of the slot terminate at the edges of webs or hinge portions joining adjacent pairs of the leaf portions along a portion of their peripheries. Leaf portion 18 is joined to leaf portion 16 by a hinge portion 24 defined between the ends of slot 12, and leaf portion 20 is joined to leaf portion 18 by a hinge portion 22 defined between the ends of slot 14. The leaf portions are otherwise unconnected with each other.

Each leaf portion can thus flex in an axial direction normal to the plane of disk 10 relative to the adjacent leaf portion about their common hinge portion. That is to say, leaf portion 20 can flex in an axial direction normal to the plane of disk 10 relative to leaf portion 18 by bending about hinge portion 22 in the manner of a lever. Similarly, leaf portion 18 can flex in an axial direction normal to the plane of disk 10 relative to leaf portion 16 about the hinge portion 24.

In order to provide maximum flexibility, the hinge portions connecting alternate pairs of the leaf portions are spaced angularly from each other in the plane of disk 10 about the central axis normal to the plane of the disk. For maximum flexibility, the hinge portions connecting alternate pairs of the leaf portions are angularly spaced from each other 180° about the central axis normal to the plane of the disk. Hence, hinge portion 22 connecting the adjacent pairs of leaf portions 18 and 20 is angularly spaced 180° from hinge portion 24 connecting the alternate pairs of leaf portions 16 and 18.

As shown in the drawings, the hinge portions 22 and 24 are of reduced thickness relative to the leaf portions 16, 18 and 20 to provide for greater flexibility of each leaf portion relative to its adjacent leaf portion while at the same time permitting each leaf portion to have sufficient thickness to provide rigidity in a radial direction. The leaf portion 20 is shown with an opening 26 for supporting an armature rod or the like, and the construction of the spring is such that the leaf portion can be thick enough to provide relatively rigid support for the rod in a transverse or radial direction; that is, in the direction of the plane of the disk 10, while at the same time the reduced thickness of the hinge portions provides a high degree of axial flexibility permitting relatively free movement of the rod in an axial direction.

As shown in the preferred embodiment, the leaf portions are concentric with each other and comprise an outer peripheral leaf portion 16, the central leaf portion 20, and an intermediate leaf portion 18 between the peripheral and central leaf portions. As stated above, the leaf portions are concentric with each other, and preferably are circular, being formed by concentric arcuate slots 12 and 14.

In operation, the peripheral leaf portion 16 is normally clamped against movement and a movable armature rod or similar element is received in the opening 26 in the central leaf portion 20. Axial movement of the rod causes the leaf portion 20 to flex about hinge portion 22 relative to leaf portion 18, and leaf portion 18 to flex about hinge portion 24 relative to the peripheral leaf portion 16.

While a specific example of the invention has been illustrated in the accompanying drawings, it should be understood that the invention is not limited to the exact construction shown, but that various alternatives, modifications and equivalents will be apparent to those skilled in the art without departing from the scope and the spirit of the invention.

The embodiments of the invention in which an exclusive property or privilege is claimed are defined as follows:

1. A diaphragm spring comprising: a flat disk member; a pair of concentric, arcuate slots dividing said disk member into a peripheral leaf portion, an intermediate leaf portion, and a central leaf portion; and a pair of hinge portions of reduced thickness, one of which is formed between the ends of one of said arcuate slots to join the peripheral leaf portion to the intermediate leaf portion, and the other of which is formed between the ends of the other of said arcuate slots to join the intermediate leaf portion to the central leaf portion, said pair of hinge portions being disposed 180° apart relative to the central axis of the disk member.

2. A spring comprising: a disk; a plurality of concentric, arcuate slots dividing said disk into a plurality of leaf portions including a peripheral leaf portion, at least one intermediate leaf portion, and a central leaf portion; hinge portions defined between the ends of each of said slots joining the peripheries of adjacent pairs of said leaf portions; said hinge portions being of reduced thickness relative to said leaf portions.

3. A spring as claimed in claim 2 wherein the hinge portions connecting alternate pairs of the leaf portions are angularly spaced from each other in the plane of the disk about the central axis normal to the plane of the disk.

4. A spring as claimed in claim 2 wherein the hinge portions connecting alternate pairs of the leaf portions are angularly spaced 180° from each other in the plane of the disk about the central axis normal to the plane of the disk.

References Cited

UNITED STATES PATENTS

| | | | |
|---|---|---|---|
| 2,625,629 | 1/1953 | Coldwell | 267—1 |
| 2,697,145 | 12/1954 | Winet | 267—1 |

JAMES B. MARBERT, Primary Examiner